(12) United States Patent
Watwe et al.

(10) Patent No.: US 8,999,514 B2
(45) Date of Patent: Apr. 7, 2015

(54) BOND COATING POWDER COMPRISING MCRALY (M=NI,FE,CO), METHOD OF MAKING, AND A METHOD OF APPLYING AS BOND COATING

(75) Inventors: Arunkumar Shamrao Watwe, Greenville, SC (US); Yuk-Chiu Lau, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 13/366,048

(22) Filed: Feb. 3, 2012

(65) Prior Publication Data

US 2013/0202792 A1    Aug. 8, 2013

(51) Int. Cl.
| | |
|---|---|
| B22F 1/00 | (2006.01) |
| B22F 9/04 | (2006.01) |
| B32B 5/16 | (2006.01) |
| C22C 1/10 | (2006.01) |
| C22C 32/00 | (2006.01) |
| C22C 33/02 | (2006.01) |
| C23C 4/08 | (2006.01) |
| C23C 4/06 | (2006.01) |
| C23C 24/04 | (2006.01) |
| B22F 5/04 | (2006.01) |

(52) U.S. Cl.
CPC ............ C22C 1/1084 (2013.01); *C01P 2004/90* (2013.01); *C01P 2004/80* (2013.01); *B23C 2222/61* (2013.01); *B22F 5/04* (2013.01); C22C 32/0026 (2013.01); C22C 33/02 (2013.01); C23C 4/085 (2013.01); C23C 4/065 (2013.01); C23C 24/04 (2013.01)

(58) Field of Classification Search
CPC . C23C 24/04; C23C 2222/61; C01F 17/0012; C01G 49/009; C01G 53/006; C01G 51/006; C01P 2004/80; C01P 2004/90; C01P 2004/00
USPC ............. 427/201; 75/228, 232, 246; 428/548, 428/552, 564
See application file for complete search history.

(56) References Cited

U.S. PATENT DOCUMENTS

| | | | | |
|---|---|---|---|---|
| 3,617,358 | A | * | 11/1971 | Dittrich .......................... 427/447 |
| 5,277,936 | A | | 1/1994 | Olson et al. |
| 5,322,666 | A | * | 6/1994 | Watwe ............................ 419/32 |
| 5,534,353 | A | * | 7/1996 | Kaba et al. .................... 428/552 |
| 5,557,846 | A | | 9/1996 | Wei et al. |

(Continued)

OTHER PUBLICATIONS

X. Chen et al., Mechanisms governing the high temperature erosion of thermal barrier coatings, Wear, Mar. 17, 2003; pp. 735-746, vol. 256, www.elsevier.com.

(Continued)

*Primary Examiner* — Holly Le
(74) *Attorney, Agent, or Firm* — McNees, Wallace & Nurick, LLC (57) ABSTRACT

Provided is bond coating powder and method of making. The method includes providing a powder including a plurality of parent particles. The method includes providing a plurality of dispersoids. The method includes mechanically alloying the powder and the plurality of dispersoids at ambient temperature. The mechanical alloying operable to provide a selective occupation of the plurality of dispersoids in a grain boundary area of the plurality of parent particles providing the bond coating powder. The plurality of dispersoids occupy about 18 percent to about 30 percent of the grain boundary area of the bond coating powder.

18 Claims, 5 Drawing Sheets

(56) References Cited

U.S. PATENT DOCUMENTS

| | | | |
|---|---|---|---|
| 5,879,860 A * | 3/1999 | Rosolen et al. | 430/296 |
| 6,045,928 A * | 4/2000 | Tsantrizos et al. | 428/623 |
| 2001/0034296 A1* | 10/2001 | Xiao et al. | 501/87 |
| 2003/0180571 A1* | 9/2003 | Singh | 428/633 |
| 2005/0133121 A1* | 6/2005 | Subramanian et al. | 148/325 |
| 2007/0151639 A1* | 7/2007 | Oruganti et al. | 148/677 |
| 2011/0135489 A1* | 6/2011 | Strangman | 416/241 R |

OTHER PUBLICATIONS

George E. Kim, Julie Schoenung et al., Virgil Provenzano; "n-MCrAlY Bond Coating for Thermal Barrier Coating", Jul. 16, 2006, www.perpetualtech.ca.

J. Toscano et al., "Parameters Affecting TGO Growth and Adherence on MCrAlY-Bond Coats for TCB's", 2006, Abstract 784, A3-2-5, pp. 1-21, Forschungszentrum Jülich, Institute for Materials and Processes in Energy Systems, 52425 Jülich, FRG.

* cited by examiner

BOND COATING POWDER COMPRISING MCRALY (M=NI,FE,CO), METHOD OF MAKING, AND A METHOD OF APPLYING AS BOND COATING

FIELD OF THE INVENTION

The present invention relates generally to coatings and more specifically to a bond coating powder and method of making the bond coating powder and method of applying the bond coating powder to components in gas turbines.

BACKGROUND OF THE INVENTION

Many of the cobalt and nickel based superalloy materials traditionally used to fabricate the majority of combustion turbine components used in the hot gas path section of the combustion turbine engine are insulated from the hot gas flow by coating the components with a thermal barrier coating (TBC) in order to survive long term operation in this aggressive high temperature combustion environment.

TBC systems often consist of four layers: the metal substrate, a McAlY (where M is Ni, Co or a combination thereof) bond coat, a thin thermally grown oxide (TGO) formed during service, and ceramic topcoat. The ceramic topcoat is typically composed of yttria-stabilized zirconia (YSZ), which is desirable for having very low thermal conductivity while remaining stable at nominal operating temperatures typically seen in applications. TBCs experience degradation through various degradation modes that include mechanical rumpling of bond coat during thermal cyclic exposure, accelerated oxidation of bond coat, hot corrosion, and molten deposit degradation. With the loss of the TBC, the component experiences much higher temperatures and the component life is reduced dramatically.

Typical MCrAlY bond coats have a 2-phase structure of fine $\gamma$-(M) (face-center cubic) and $\beta$-(M)Al (body-center cubic). The $\beta$-(M)Al phase is the aluminum (Al) reservoir. Aluminum in the bond coat will be depleted during service by either diffusion to the bond coat/TBC interface forming $\alpha$-$Al_2O_3$ TGO or into the substrate. Spallation of the TBC will occur when the TGO layer is very thick or there is no more aluminum from the bond coat to form the adherent $\alpha$-$Al_2O_3$ scale. Aluminum diffusion and TGO growth depend on bond coat temperatures, i.e., higher bond coat temperatures will accelerate aluminum diffusion and TGO growth, and hence TBC spallation and reduce component service life. Therefore, bond coat temperatures are limited due to oxidation, spallation, and depletion of the aluminum reservoir in the bond coating. Some standard bond coatings, such as GT33 (available from Sulzer Metco, Westbury, N.Y.) have operational temperature limits of about 1750° F. At temperature higher than the operational temperature limit, the bond coating will deteriorate much faster due to accelerated oxidation which increases the chances of spallation of the thermal barrier coating (TBC) applied to the bond coating and hence reduce the component service life.

Therefore, a bond coating powder and method of making the bond coating powder and method of applying the bond coating powder to components in gas turbines that do not suffer from the above drawbacks is desirable in the art.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure, a method of making a bond coating powder is provided. The method includes providing a powder including a plurality of parent particles. The method includes providing a plurality of dispersoids. The method includes mechanically alloying the powder and the plurality of dispersoids at ambient temperature. The mechanically alloying being operable to provide a selective occupation by the plurality of dispersoids in a grain boundary area of the plurality of parent particles of the bond coating powder. The plurality of dispersoids occupy about 18 percent to about 30 percent of the grain boundary area.

According to another exemplary embodiment of the present disclosure, a bond coating powder is provided. The bond coating powder includes a plurality of parent particles having a plurality of dispersoids mechanically alloyed with the plurality of parent particles forming the bond coating powder. The plurality of dispersoids selectively occupy a grain boundary area of the plurality of parent particles of the bond coating powder. The plurality of dispersoids occupy from about 18 percent to about 30 percent of the grain boundary area.

According to another exemplary embodiment of the present disclosure, a method of applying a bond coating to a component is provided. The method includes providing a bond coating powder including a plurality of parent particles. The method includes providing a plurality of dispersoids. The method includes mechanically alloying the powder and the plurality of dispersoids at ambient temperature, the mechanically alloying being operable to provide a selective occupation by the plurality of dispersoids in a grain boundary area of the plurality of particles of the bond coating powder. The plurality of dispersoids occupy about 18 percent to about 30 percent of the grain boundary area. The method includes applying the bond coating powder to the component wherein a bond coating forms on the metallic component, wherein the plurality of dispersoids occupying the grain boundary area of the bond coating reduces the depletion rate of aluminum from the bond coating to an adjacent bond coat and thermal barrier coating interface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an economically viable method of making a bond coating powder and method of applying the bond coating powder to components in gas turbines that do not suffer from the drawbacks in the prior art. One advantage of an embodiment of the present disclosure is that the bond coating powder and bond coating of the present disclosure provide heavily occupied grain boundaries. Another advantage of an embodiment of the present disclosure is that dispersoids occupying the grain boundaries of the bond coating inhibit volume and grain boundary diffusion of aluminum to the underlying superalloy component or to the bond coat/TBC interface thereby slowing alumina scale growth reducing spalling of the TBC from the bond coating. Yet another advantage of the present disclosure is a bond coating powder and bond coating that provides a slow formation of alumina in the bond coating. Another advantage of the present disclosure is that the bond coating powder and bond coating provide heavily occupied grain boundaries. Yet another advantage of the present disclosure is that the life of TBC of the present disclosure is greater than that of traditional TBC/bond coating systems.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, gas turbines, steam turbines, and other turbine assemblies. In certain applications, the power generation systems, including the turbomachinery therein (e.g., turbines, compressors, and pumps) and other machinery may include components that are exposed to heavy wear conditions. For example, certain power generation system components such as blades, casings, rotor wheels, shafts, shrouds, nozzles, and so forth, may operate in high heat and high revolution environments. Materials for components are manufactured from nickel based superalloys, cobalt based superalloys, chromium based superalloys, and combinations thereof and include a bond coating and thermal barrier coating (TBC) generally manufactured from ceramics. The present disclosure provides a durable and reliant bond coating between the base material and TBC of the gas turbine components.

Figure 1:
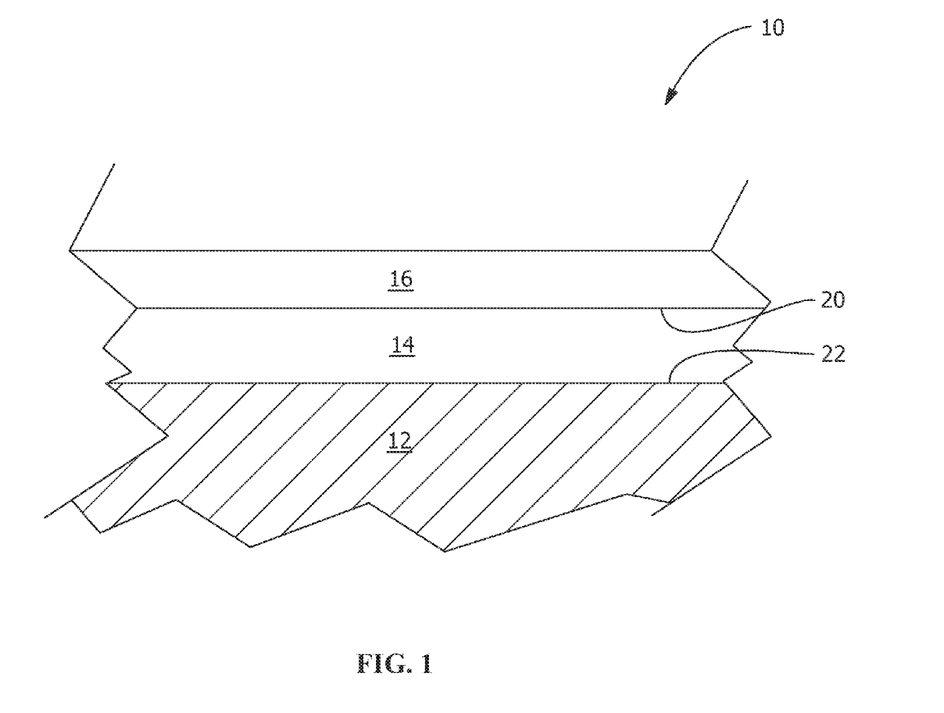
FIG. 1 is a sectional view of a component including a coating of the bond coating powder of the present disclosure.

FIG. 1 is a schematic of a component 10 including a substrate 12 having a bond coating 14 and thermal barrier coating (TBC) 16 applied thereto. Component 10 can be any component of a power generation system such as, but not limited to, blades, casings, rotor wheels, shafts, shrouds, and nozzles. Substrate 12 of component 10 is generally selected from material that withstands high temperatures and harsh operating environments. Suitable examples of material for substrate 12 include, but are not limited to, erosion resistant materials including cobalt, chromium, tungsten, carbon, nickel, iron, silicon, molybdenum, manganese, alloys thereof and combinations thereof. Suitable examples of materials for TBC 16 include, but are not limited to, ceramics based on zirconium stabilized with an oxide or rare-earth oxide, such as yttrium oxide, magnesium oxide, or cerium oxide. Bond coating 14 is applied adjacent to or between substrate 12 and TBC 16 to provide a transition between the different coefficients of thermal expansion between the metallic material of substrate 12 and ceramic based material of TBC 16. Bond coating 14 provides oxidation resistance to substrate 12 and a rough surface for mechanical bonding of TBC 16 to substrate 12. Bond coating 14 includes bond coating powder 210 (see FIG. 2). Bond coating 14 of the present disclosure reduces the depletion rate of aluminum from bond coating 14 to adjacent bond coat and thermal barrier coating interface 20. Additionally, bond coating 14 reduces the depletion rate of aluminum from bond coating 14 to adjacent bond coat and substrate interface 22.

Figure 2:
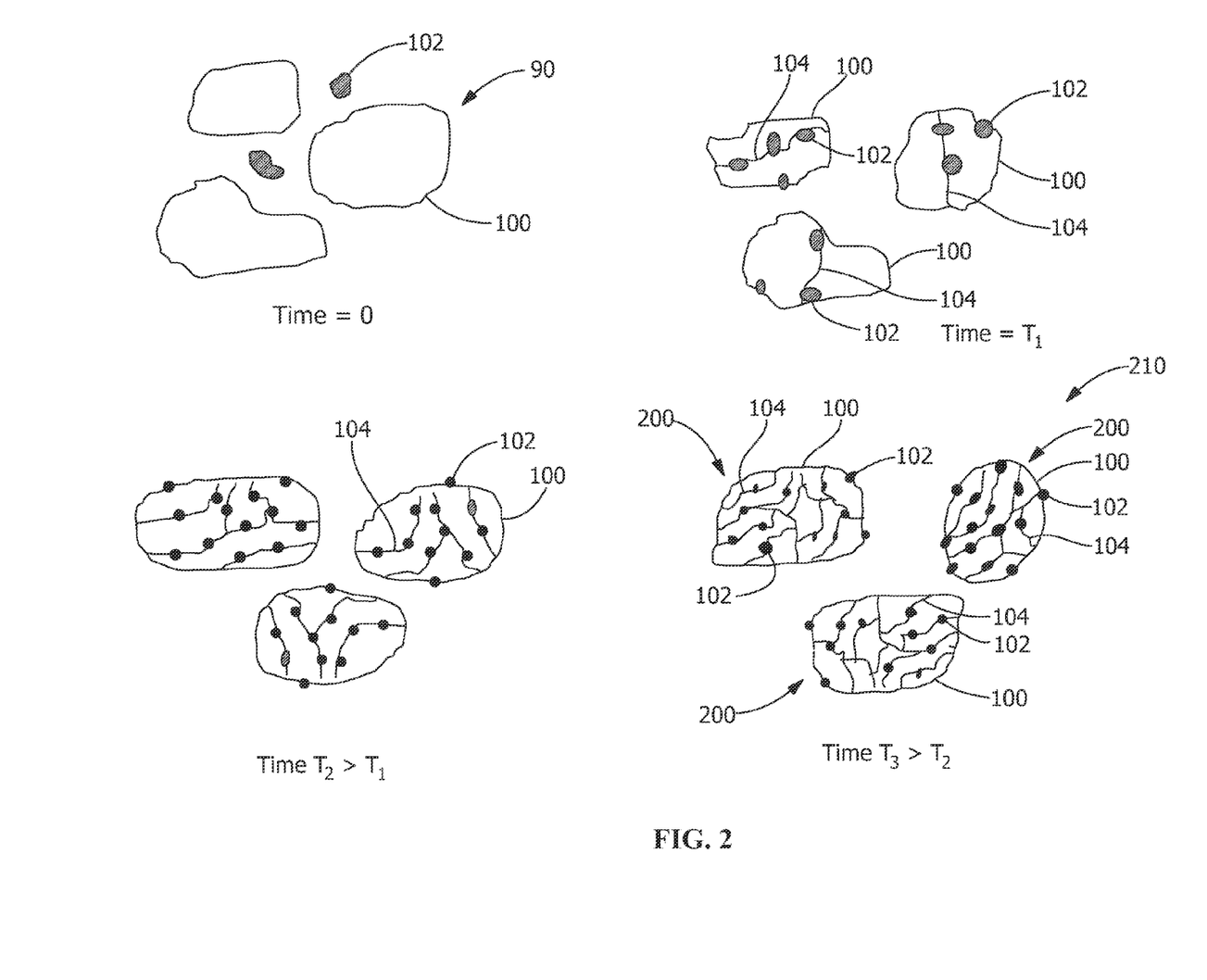
FIG. 2 is a time-lapsed schematic of a bond coating powder of the present disclosure.

FIG. 2 is a schematic time lapse at time zero, at the start of mechanically alloying, Time 1 ($T_1$), during mechanically alloying, Time 2 ($T_2$) and after mechanically alloying, Time 3 ($T_3$) of the manufacturing of bond coating powder 210 used to make bond coating 14 (see FIG. 1). Bond coating powder 210 (at Time $T_3>T_2$) includes a plurality of parent particles 100 having a plurality of dispersoids 102 mechanically alloyed with plurality of parent particles 100 forming resulting in a somewhat modified bond coating powder 210. Bond coating powder 210 is modified because it contains plurality of dispersoids occupying grain boundary 104 of parent particles 100 (see FIG. 2, Time 3). Mechanically alloying includes ball milling, high-energy ball milling, attritor milling, triaxial vibratory milling, and combinations thereof. Mechanical alloying is optionally conducted in an inert atmosphere, such as under argon, to minimize oxidation of active surfaces that are created when particles fracture during milling. Mechanical alloying is optionally performed at a reduced temperature to minimize excessive cold welding between particles. Mechanically alloying is conducted at ambient temperature of approximately 10° C. to approximately 37.8° C. (approximately 50° F. to approximately 100° F.). Mechanical alloying is conducted for a short period of time of approximately 2 hours to approximately 10 hours or alternatively approximately 3 hours to approximately 9 hours or alternatively approximately 4 hours to approximately 8 hours.

As shown in FIG. 2 at time zero (Time=0), prior to mechanically alloying, plurality of parent particles 100 and plurality of dispersoids 102 are separate and form a powder 90. At time zero (Time=0) the size of the parent particles 100 and plurality of dispersoids is relatively the same. At the start of mechanically alloying, at Time=$T_1$, plurality of dispersoids 102 are beginning to occupy grain boundary 104 of plurality of parent particles 100 and size of plurality of dispersoids 102 is beginning to shrink. After $T_1$ and before completing mechanical alloying at Time $T_2>T_1$, more of grain boundary 104 of plurality of parent particles 100 is occupied by plurality of dispersoids 102. After mechanical allying at Time $T_3>T_2$ plurality of dispersoids 102 selectively occupy from approximately 18 percent to approximately 30 percent of grain boundary area 104 of plurality of parent particles 100 providing bond coating powder 210. Without being bound by theory, it is believed that mechanical alloying obtains submicron grain sizes and uniform distribution of dispersoids 102 along grain boundaries 104 of plurality of parent particles 100. It is also believed, without being bound by theory, that plurality of dispersoids 102 occupying grain boundaries 104 limit volume and grain boundary diffusion and coarsening, thereby reducing the aluminum (Al) depletion rate and increased the TBC spallation life.

Figure 3:
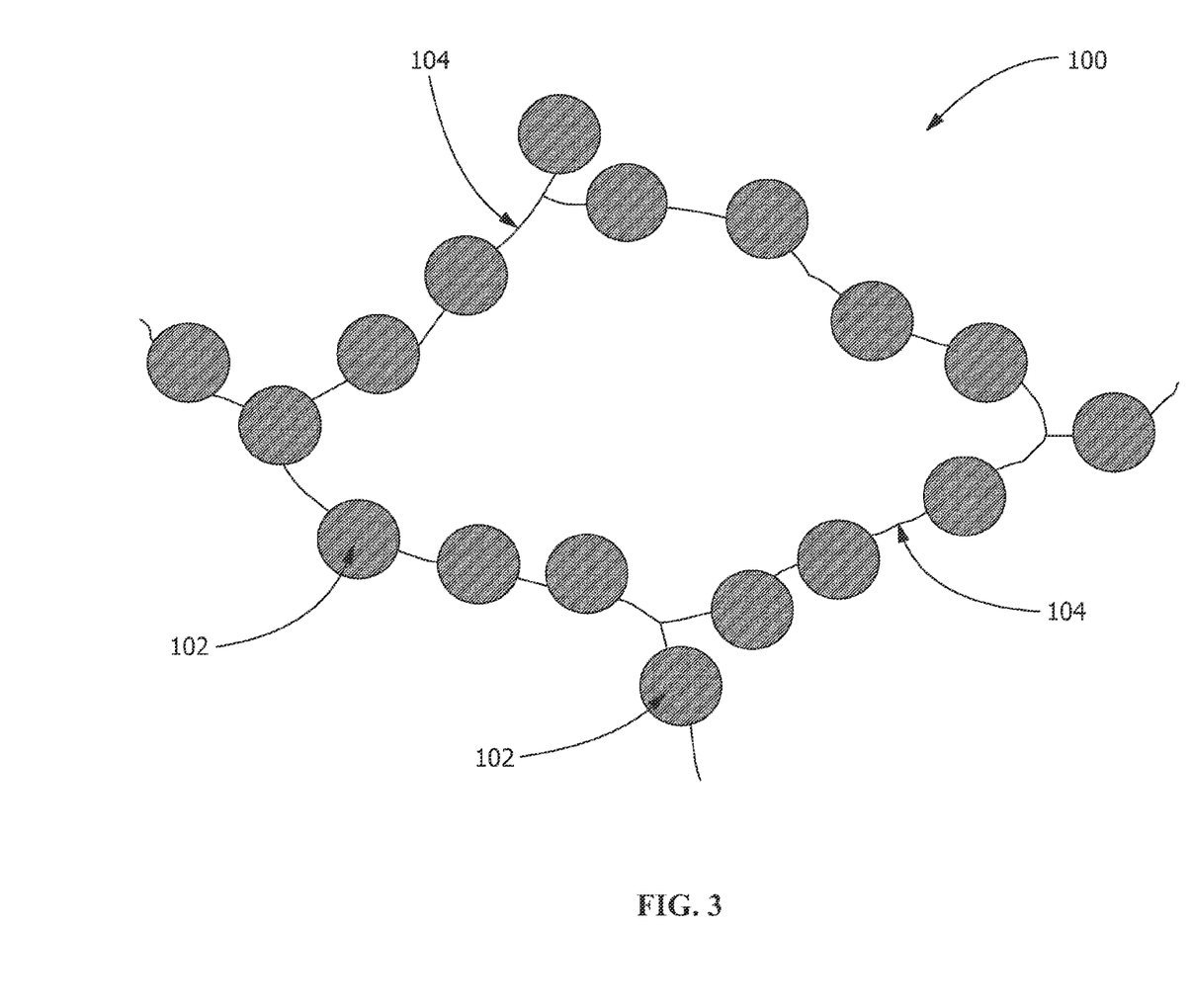
FIG. 3 is a schematic of a grain boundary in a single particle of the bond coating powder of the present disclosure.

FIG. 3 is a typical grain in a modified single particle 200 of bond coating powder 210. Modified single particle 200 includes plurality of dispersoids 102 occupying from approximately 18 percent to approximately 30 percent of grain boundary area 104 or alternatively approximately 22 percent to approximately 28 percent of grain boundary area 104 or alternatively approximately 23 percent to approximately 27 percent of grain boundary area 104 of bond coating powder 210.

Plurality of dispersoids 102 are selected from particles, such as, but not limited to, zirconium-oxide ($ZrO_2$), aluminum-oxide ($Al_2O_3$), yttrium-oxide ($Y_2O_3$), magnesium-oxide (MgO), cerium-oxide (CeO), and combinations thereof. Particle size of plurality of dispersoids 102 after mechanical alloying is from approximately 0.010 micron to approximately 0.020 microns or alternatively from approximately 0.010 microns to approximately 0.018 microns or alternatively from approximately 0.010 microns to approximately 0.015 microns. Plurality of dispersoids 102 comprise from approximately 0.5% by weight to approximately 1% by weight or alternatively from approximately 0.5% by weight to approximately 0.9% by weight or alternatively approximately 0.5% by weight to approximately 0.8% by weight of bond coating powder 210. Plurality of dispersoids 102 have a hardness of greater than about 4 Mohs.

Figure 4:
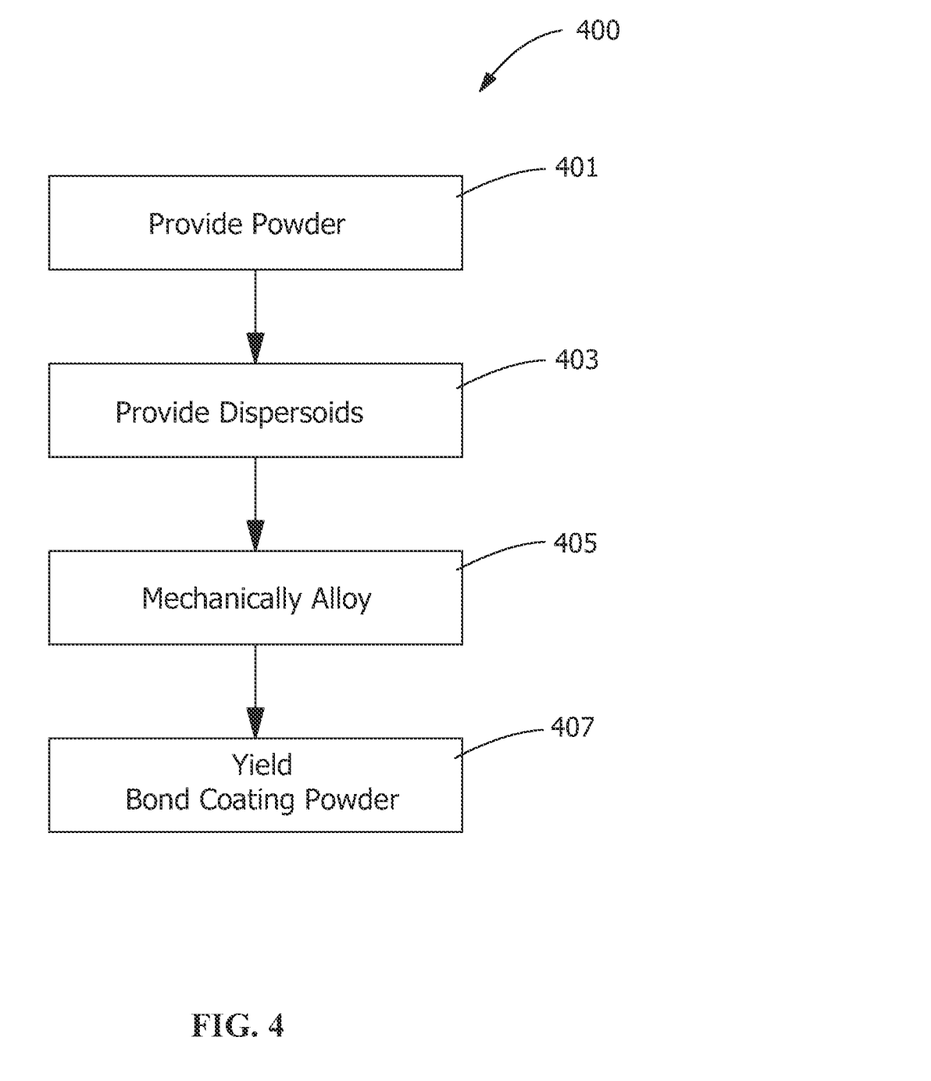
FIG. 4 is a flow chart a method of making a bond coating powder of the present disclosure.

FIG. 4 is a flow chart of method 400 of providing bond coating powder 210. Method 400 includes providing a powder 90 including plurality of parent particles 100, step 401, and providing a plurality of dispersoids 102 (see FIG. 2 at Time=0), step 403. Method 400 includes mechanically alloying powder 90 and plurality of dispersoids 102 at ambient temperature (see FIG. 2 at Time=$T_1$ and Time=$T_2$>$T_1$), step 405. Mechanical alloying is operable to provide a selective occupation of plurality of dispersoids 102 in grain boundary area 104 of plurality of parent particles 100 providing bond coating powder 210 (see FIG. 2 at Time=$T_3$>$T_2$), step 407. Plurality of dispersoids 102 occupy about 18 percent to about 30 of grain boundary area 104 of parent particles 100 of bond coating powder 210 (see FIG. 2 at Time=$T_3$>$T_2$ and FIG. 3).

Figure 5:
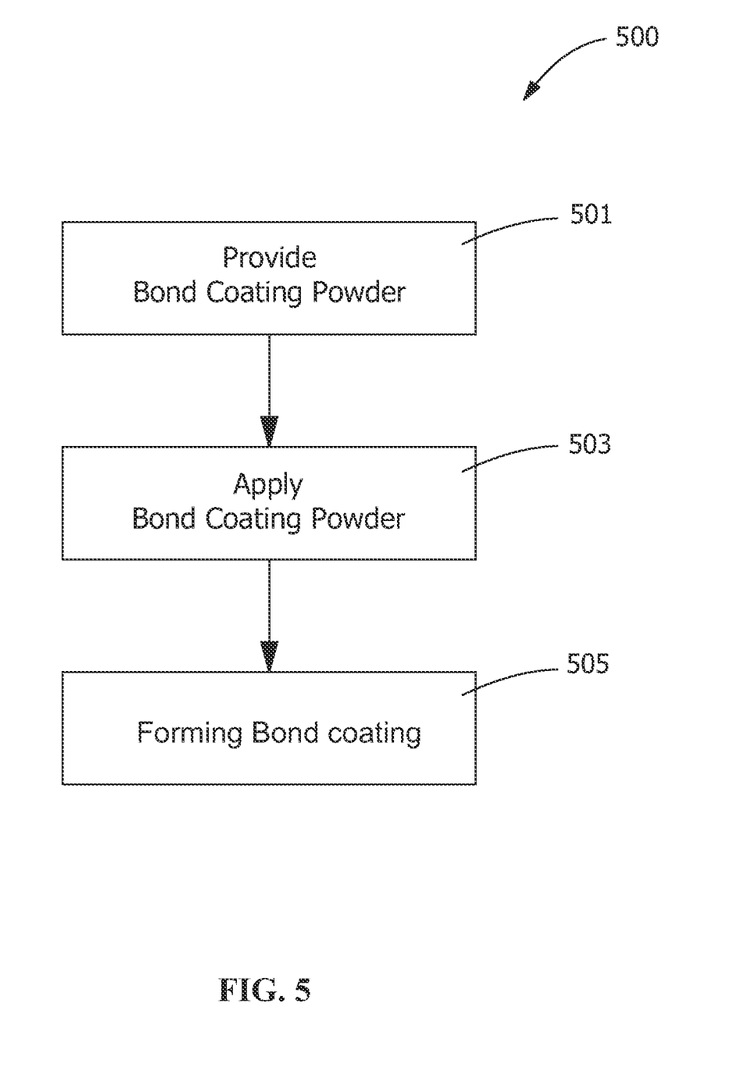
FIG. 5 is a flow chart of a method of applying a bond coating of the present disclosure.

FIG. 5 is a flow chart of method 500 of applying a bond coating 14 to a component 10 (see FIG. 1). Method 500 includes providing bond coating powder 210 (see FIG. 2 Time=$T_3$>$T_2$), step 501. As shown in FIGS. 2 and 3, bond coating powder 210 includes powder 90 including plurality of parent particles 100 and plurality of dispersoids 102 that are mechanically alloyed at ambient temperature. Mechanically alloying is operable to provide a selective occupation of plurality of dispersoids 102 in grain boundary area 104 of plurality of parent particles 100 providing bond coating powder 210. Method 500 include applying bond coating powder 210 to component 10 (see FIG. 1), step 503. Applying bond coating powder 210 is done using any suitable application method, such as but not limited to, thermal spraying processes including air plasma spraying, vacuum plasma spraying, high velocity oxy-fuel coating spraying (HVOF), warm spraying, and cold spraying processes. Method 500 includes forming bond coating 14 on component 10, see FIG. 1, step 505. Bond coating 14 reduces the depletion rate of aluminum from bond coating 14 to adjacent bond coat and thermal barrier coating interface 20 and from bond coating 14 to adjacent bond coat and substrate 12 interface 22.

EXAMPLES

The following is an estimated calculation of the percentage grain boundary area 104 occupied by dispersoids 102 in parent particles 100 after mechanically alloying at ambient temperature (see FIG. 2 at Time=$T_2$>$T_1$). The following assumptions have been made in calculating percentage of grain boundary area 104 occupied by dispersoids 102: (1) bond coat grains are generally 14-sided, truncated octahedra, which is the only space-filling shape that has all 3 grain boundaries meeting at a triple point at 120 degrees relative to each other, as required by the surface energy balance; (2) bond coat grain size is approximately 0.1 micron; (3) density of the bond coat alloy is approximately 8 g/cc; (4) spherical dispersoids 102 have a diameter of approximately 0.01 micron; (5) dispersoids 102 content is about 1 w % of bond coat 14; and (4) grain boundaries go through the center of dispersoids 102.

The present disclosure provides that approximately 27% of grain boundary area 104 of parent particle 100 of bond coating powder 210 is occupied when dispersoid 102 is $Al_2O_3$. The present disclosure provides that approximately 25% of grain boundary area 104 of parent particle 100 of bond coating powder 210 occupied when dispersoid 102 is $Y_2O_3$. The present disclosure provides that approximately 18% of grain boundary area 104 of parent particle 100 of bond coating powder 210 is occupied when dispersoid 102 is $ZrO_2$. Generally, it has been estimated that lighter dispersoid 102 and higher dispersoid 102 content in parent particles 100, the higher percentage occupation of grain boundary area 104 in bond coating powder 210.

The following calculation was estimated for the reduction in the diffusion rate of the present disclosure. In the diffusion rate, the flux of atoms is proportional to the area normal to the flow direction. Aluminum will diffuse through the volume of the bond coat 14 by traversing the grains and crossing the boundaries whenever these boundaries are encountered. In the absence of any grain boundary dispersoids, the aluminum atoms can also travel along the boundaries of the bond coat, thereby allow the aluminum to diffuse of the bond coat and weaken the bond coat. For unit area, the flux, expressed in arbitrary units, is given by the following equations:

$$\text{Standard bond coat: Flux } J = 26.5\, D(gb) + D(v)$$

where D(gb) is the diffusion coefficient for grain boundary; and D(v) is the is the diffusion coefficient for volume diffusion, $$\text{MA bond coat: Flux } J = f \times D(v)$$

where f is the fraction of boundary area occupied; and D(v) is the is the diffusion coefficient for volume diffusion. In the present disclosure, there is little or no grain boundary diffusion of aluminum. This diffusion of aluminum is stopped by the plurality of dispersoids 102 in the grain boundaries 104 of the plurality of parent particles 100 (see FIG. 2 at Time=$T_2$>$T_1$). When the aluminum atoms encounter a dispersoid while diffusing along grain boundary 104, the aluminum atoms will enter a grain and participate in volume diffusion. In the present disclosure, the lowest amount of reduction in diffusion will be for the case when D(gb)<<D(v), such that the diffusion rate will be reduced by about 27% when the dispersoids 102 are $Al_2O_3$. If D(gb)>D(v), the extent of reduction in diffusion rate of aluminum atoms will be even greater than 27% when dispersoids 102 are $Al_2O_3$.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a bond coating powder comprising:
   providing a powder including a plurality of parent particles selected from the group consisting of MCrAlY, wherein M is Ni, Fe, Co, and combinations thereof;
   providing a plurality of dispersoids; and
   mechanically alloying the plurality of parent particles and the plurality of dispersoids at ambient temperature, the mechanical alloying being operable to provide a selective occupation by the plurality of dispersoids in a grain boundary area of the plurality of parent particles of the bond coating powder;
   wherein the plurality of dispersoids occupy about 18 percent to about 30 percent of the grain boundary area; and
   wherein the plurality of dispersoids selectively occupying the grain boundary area of the plurality of parent particles include a property of reducing a rate of aluminum depletion from the bond coating powder relative to a comparable bond coating lacking the plurality of dispersoids.

2. The method of claim 1, wherein the plurality of dispersoids are selected from the group consisting of zirconium-oxide ($ZrO_2$), aluminum-oxide ($Al_2O_3$), yttrium-oxide ($Y_2O_3$), magnesium-oxide (MgO), cerium-oxide (CeO) and combinations thereof.

3. The method of claim 1, wherein the plurality of dispersoids have a particle size from about 0.010 microns to about 0.020 microns after mechanically alloying.

4. The method of claim 1, wherein the plurality of dispersoids comprise from about 0.5% by weight to about 1% by weight of the bond coating powder.

5. The method of claim 1, wherein the plurality of dispersoids have a hardness of greater than about 4 Mohs.

6. The method of claim 1, wherein the plurality of dispersoids occupying the grain boundary area hinders grain coarsening in a bond coat layer.

7. The method of claim 1, wherein the step of mechanically alloying includes ball milling, high-energy ball milling, attritor milling, triaxial vibratory milling, and combinations thereof.

8. A bond coating powder comprising:
   a plurality of parent particles selected from the group consisting of MCrAlY, wherein M is Ni, Fe, Co, and combinations thereof; and
   a plurality of dispersoids mechanically alloyed with the plurality of parent particles forming the bond coating powder, wherein the plurality of dispersoids selectively occupy a grain boundary area of the plurality of parent particles providing a bond coating powder;
   wherein the plurality of dispersoids occupy from about 18 percent to about 30 percent of the grain boundary area; and
   wherein the plurality of dispersoids selectively occupying the grain boundary area of the plurality of parent particles include a property of reducing a rate of aluminum depletion from the bond coating powder relative to a comparable bond coating lacking the plurality of dispersoids.

9. The bond coating of claim 8, wherein the plurality of dispersoids are selected from the group consisting of zirconium-oxide ($ZrO_2$), aluminium-oxide ($Al_2O_3$), yttrium-oxide ($Y_2O_3$), magnesium-oxide (MgO), cerium-oxide (CeO), and combinations thereof.

10. The bond coating of claim 8, wherein the plurality of dispersoids have a particle size from about 0.010 microns to about 0.020 microns after mechanically alloying.

11. The bond coating of claim 8, wherein the plurality of dispersoids comprise from about 0.5% by weight to about 1% by weight of the bond coating powder.

12. The bond coating of claim 8, wherein the plurality of dispersoids have a hardness of greater than about 4 Mohs.

13. A method of applying a bond coating to a component comprising:
   providing a bond coating powder including a plurality of parent particles selected from the group consisting of MCrAlY, wherein M is Ni, Fe, Co, and combinations thereof;
   providing a plurality of dispersoids;
   mechanically alloying the plurality of parent particles and the plurality of dispersoids at ambient temperature, the mechanically alloying being operable to provide a selective occupation by the plurality of dispersoids in a grain boundary area of the plurality of particles of the bond coating powder, the plurality of dispersoids occupying about 18 percent to about 30 percent of the grain boundary area;
   applying the bond coating powder to the component, wherein a bond coating forms on the metallic component, wherein the plurality of dispersoids selectively occupying the grain boundary area of the plurality of parent particles include a property of reducing a rate of aluminum depletion from the bond coating powder to an adjacent bond coat and thermal barrier coating interface relative to a comparable bond coating lacking the plurality of dispersoids.

14. The method of claim 13, wherein the step of mechanically alloying includes ball milling, high-energy ball milling, attritor milling, triaxial vibratory milling, and combinations thereof.

15. The method of claim 13, wherein the plurality of dispersoids are selected from the group consisting of zirconium-oxide ($ZrO_2$), aluminum-oxide ($Al_2O_3$), yttrium-oxide ($Y_2O_3$), magnesium-oxide (MgO), cerium-oxide (CeO), and combinations thereof.

16. The method of claim 13, wherein the plurality of dispersoids have a particle size of from about 0.010 microns to about 0.020 microns.

17. The method of claim 13, wherein the plurality of dispersoids comprise from about 0.5% by weight to about 1% by weight of the bond coating powder.

18. The method of claim 13, wherein the plurality of dispersoids have a hardness of greater than about 4 Mohs.

* * * * *